United States Patent
Huang et al.

(10) Patent No.: US 9,819,664 B2
(45) Date of Patent: Nov. 14, 2017

(54) METHOD AND DEVICE FOR IMPLEMENTING A PROCESS UNDER A SUPERUSER PRIVILEGE, AND MOBILE TERMINAL

(71) Applicant: TENCENT TECHNOLOGY (SHENZHEN) COMPANY LIMITED, Shenzhen (CN)

(72) Inventors: Zefeng Huang, Shenzhen (CN); Zhanghu Luo, Shenzhen (CN); Ze Zhang, Shenzhen (CN); Yunfeng Dai, Shenzhen (CN); Danhua Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 222 days.

(21) Appl. No.: 14/736,314

(22) Filed: Jun. 11, 2015

(65) Prior Publication Data

US 2015/0281206 A1    Oct. 1, 2015

Related U.S. Application Data

(63) Continuation of application No. PCT/CN2013/088115, filed on Nov. 29, 2013.

(30) Foreign Application Priority Data

Dec. 20, 2012 (CN) .......................... 2012 1 0555024

(51) Int. Cl.
*H04L 29/06* (2006.01)
*G06F 21/00* (2013.01)
(Continued)

(52) U.S. Cl.
CPC .............. *H04L 63/08* (2013.01); *G06F 9/545* (2013.01); *G06F 21/54* (2013.01); *H04L 43/045* (2013.01);
(Continued)

(58) Field of Classification Search
CPC ... H04L 63/08; H04L 63/1408; H04L 43/045; G06F 21/54; G06F 9/545; G06F 2209/542
See application file for complete search history.

(56) References Cited

U.S. PATENT DOCUMENTS 7,024,548 B1 *  4/2006  O'Toole, Jr. ........ H04L 41/0813
                                                709/220
2002/0157021 A1 * 10/2002  Sorkin ................ H04L 63/0227
                                                726/4
(Continued)

FOREIGN PATENT DOCUMENTS

CN      101515241 A     8/2009
CN      101901313 A     12/2010
(Continued)

OTHER PUBLICATIONS

Office Action in CN Application No. 201210555024.4 dated Jan. 5, 2017, 8 pages, with concise statement of relevance.
International Preliminary Report on Patentability and Written Opinion in International Application No. PCT/CN2013/088115 dated Jun. 23, 2015.
(Continued)

*Primary Examiner* — Lisa Lewis
(74) *Attorney, Agent, or Firm* — Marshall, Gerstein & Borun LLP

(57) ABSTRACT

In an example for implementing a process under a superuser privilege within a computing device, a monitor function library for monitoring an executable function is loaded when the process acquires the superuser privilege. When it is detected that the process runs the executable function, the monitor function library may suspend the running of the
(Continued)

executable function, and output process monitoring information. If a feedback to the process monitoring information indicates that it is allowable to perform the executable function, a system function library is invoked to perform the executable function the process runs.

15 Claims, 4 Drawing Sheets

(51) Int. Cl.
*G06F 9/54* (2006.01)
*G06F 21/54* (2013.01)
*H04L 12/26* (2006.01)

(52) U.S. Cl.
CPC .... *H04L 63/1408* (2013.01); *G06F 2209/542* (2013.01)

(56) References Cited

U.S. PATENT DOCUMENTS

2005/0120242 A1* 6/2005 Mayer ................... G06F 21/56
726/4
2010/0162049 A1 6/2010 Stall et al.

FOREIGN PATENT DOCUMENTS

| CN | 101997912 | * | 3/2011 |
| CN | 101997912 A | | 3/2011 |
| CN | 102103676 A | | 6/2011 |
| CN | 102546624 A | | 7/2012 |
| WO | WO-2011/034899 A1 | | 3/2011 |

OTHER PUBLICATIONS

Search Report in International Application No. PCT/CN2013/088115 dated Mar. 6, 2014.
"Intrusion Detection Technology", Apr. 3, 2004, pp. 109-112.
Office Action in CN Application No. 201210555024.4 dated Aug. 21, 2017, 8 pages.

* cited by examiner

METHOD AND DEVICE FOR IMPLEMENTING A PROCESS UNDER A SUPERUSER PRIVILEGE, AND MOBILE TERMINAL

CROSS-REFERENCE TO RELATED APPLICATIONS

This application is a continuation of International Application No. PCT/CN2013/088115, filed on Nov. 29, 2013, entitled "METHOD AND DEVICE FOR IMPLEMENTING A PROCESS UNDER A SUPERUSER PRIVILEGE, AND MOBILE TERMINAL", which claims priority to the Chinese Patent Application No. 201210555024.4, filed on Dec. 20, 2012, the disclosure of each application is hereby incorporated in its entirety by reference.

TECHNICAL FIELD

The present disclosure relates to security of computing devices, and more particularly relates to a method and a device for implementing a process under a superuser privilege, and a corresponding mobile terminal.

BACKGROUND

In an operating system of a computing device, such as Linux system or Android system established on top of the Linux system, a superuser privilege (e.g., root privilege) is the highest privilege within the operating system, which can manage all objects of the operating system. A process having the superuser privilege can modify system files, make personalized settings and so on.

In the Linux system, the superuser privilege is disabled by default, in order to guarantee security and stability of the operating system and prevent crash of the operating system caused by a false operation of a user. In order to obtain the superuser privilege, it is required to make a request to a SU (Super User) program for authorization. The SU program is a program for managing authorization in the Linux system, which can grant a process the superuser privilege. The authorization given by the SU program to the process may be managed carefully.

SUMMARY

In an example, a method for implementing a process under a superuser privilege within a computing device is provided. The method includes: loading a monitor function library for monitoring an executable function when the process acquires the superuser privilege; when it is detected that the process runs the executable function, suspending, by the monitor function library, the running of the executable function, and outputting process monitoring information; and invoking a system function library to perform the executable function the process runs if a feedback to the process monitoring information indicates that it is allowable to perform the executable function.

In an example, a device for implementing a process under a superuser privilege is provided. The device includes: memory, and one or more processors; the memory stores one or more program modules configured for execution by the one or more processors; wherein the one or more program modules include: a monitor function library loading module, to load a monitor function library for monitoring an executable function when the process acquires the superuser privilege; a monitoring information output module, to suspend the running of the executable function and output process monitoring information when it is detected that the process runs the executable function; and an execution module, to invoke a system function library to perform the executable function the process runs if a feedback to the process monitoring information indicates that it is allowable to perform the executable function.

In an example, a mobile terminal is provided. The mobile terminal includes: memory, one or more processors, and one or more programs stored in the memory and configured for execution by the one or more processors, the one or more programs including instructions to: load a monitor function library for monitoring an executable function when the process acquires the superuser privilege; when it is detected that the process runs the executable function, suspend the running of the executable function, and output process monitoring information; and invoke a system function library to perform the executable function the process runs if a feedback to the process monitoring information indicates that it is allowable to perform the executable function.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

DETAILED DESCRIPTION

Reference will now be made in detail to examples, which are illustrated in the accompanying drawings. In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail so as not to unnecessarily obscure aspects of the examples.

In conventional art, the management of the SU program on superuser privileges is to determine whether to authorize a superuser privilege to a process based on information about the process. After the process gets the superuser privilege, the process may execute a command without further control. In other words, a user may not know what has been done by the authorized process. Such a flaw can be used to make an adverse consequence to the user. Therefore, it is necessary to provide a method and a device for controlling a process when the process has the superuser privilege.

Figure 1:
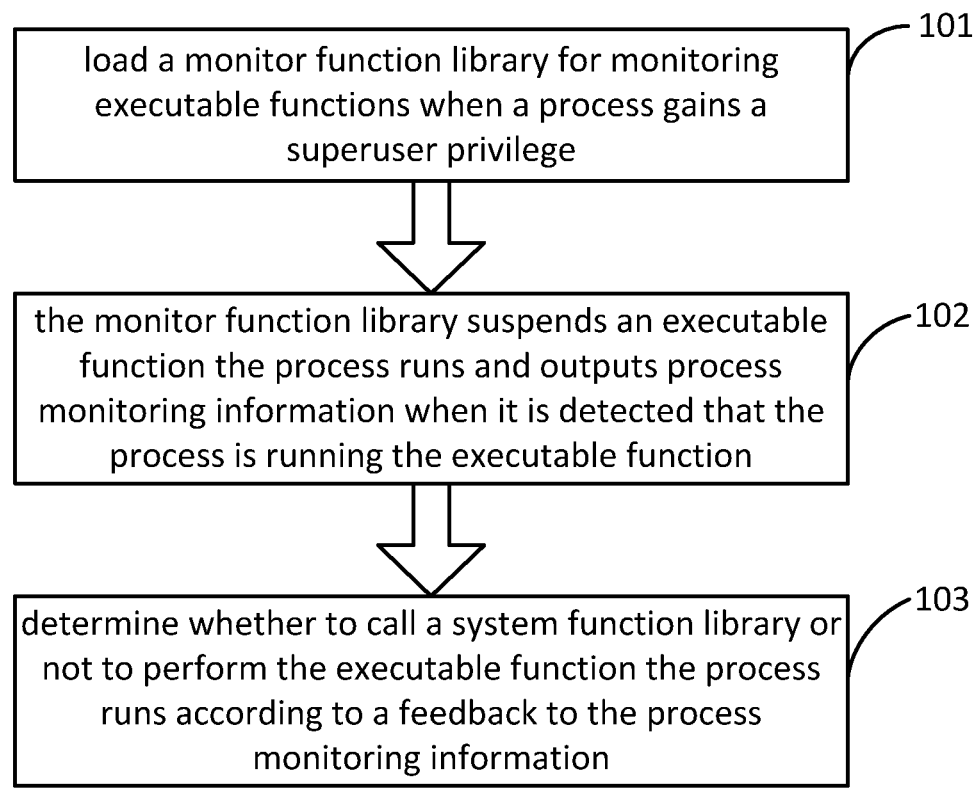
FIG. 1 is a flow diagram illustrating a method for implementing a process under a superuser privilege within a computing device according to an embodiment of the present disclosure.

FIG. 1 is a flow diagram illustrating a method for implementing a process under a superuser privilege within a computing device according to an embodiment of the present disclosure. Specifically, the method shown in FIG. 1 includes procedures illustrated in at least one of blocks 101-103.

At block 101, when the process gains the superuser privilege, a monitor function library is loaded for monitoring executable functions. In an example, the process having the superuser privilege may cause the computing device to load the monitor function library.

At block 102, when it is detected that the process runs an executable function, the monitor function library may suspend the executable function the process runs and output process monitoring information. Specifically, the process monitoring information may include operating information of one or more processes.

At block 103, according to a feedback to the process monitoring information, it is determined whether a system function library may be called to perform the executable function the process runs. In an example, the process having the superuser privilege may cause the computing device to call the system function library.

In an example, when the process is to run an executable function, a monitor function library is loaded for monitoring the executable function run by the process, and it is determined whether to perform the executable function based on the feedback provided for the process monitoring information. As such, designated executable functions can effectively be monitored, thereby ensuring the security of the computing device under the superuser privilege.

Figure 2:
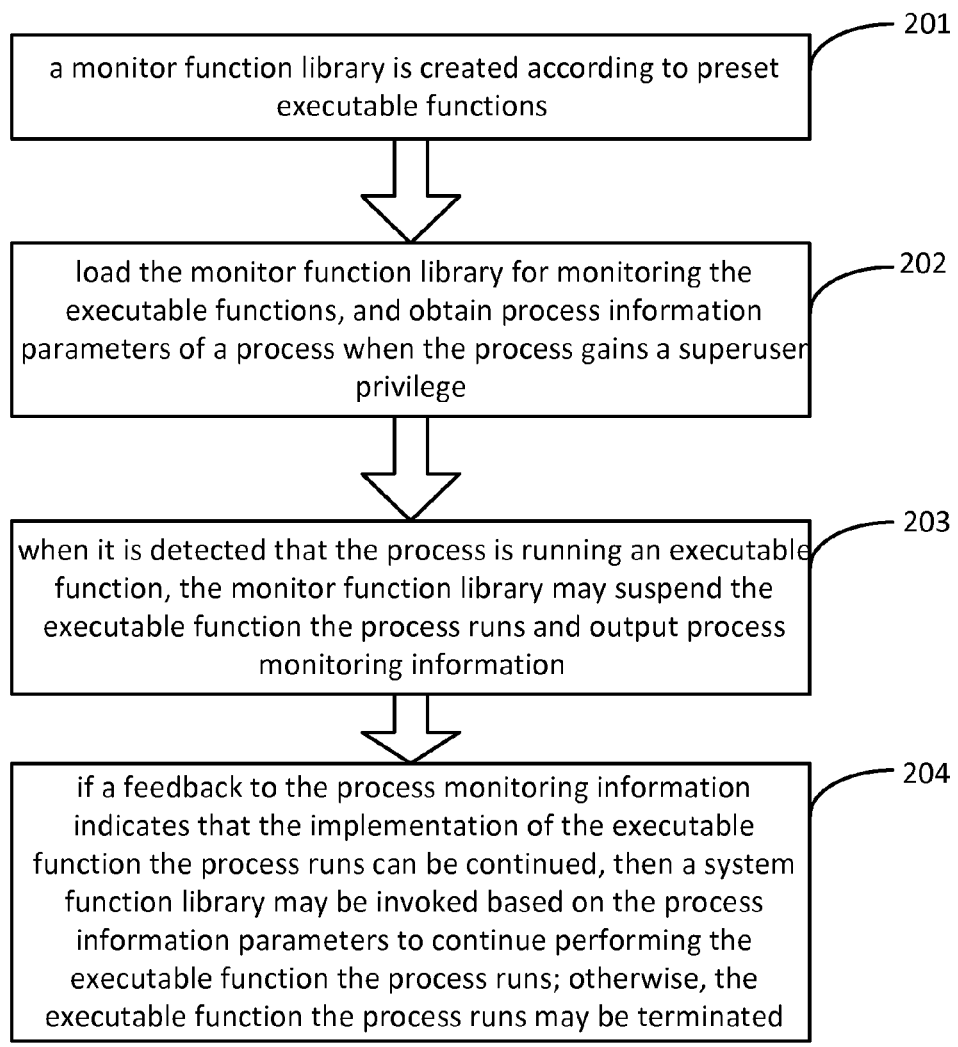
FIG. 2 is a flow diagram illustrating a method for implementing a process under a superuser privilege within a computing device according to an embodiment of the present disclosure.

FIG. 2 is a flow diagram illustrating a method for implementing a process under a superuser privilege within a computing device according to an embodiment of the present disclosure. Specifically, the method shown in FIG. 2 includes procedures illustrated in at least one of blocks 201-204.

At block 201, a monitor function library is created according to preset executable functions. In an example, the executable functions monitored by the monitor function library may be designated according to actual requirements.

At block 202, when a process gains a superuser privilege, the monitor function library may be loaded for monitoring the executable functions, and process information parameters of the process may also be obtained. Specifically, the process information parameters may include one or more identifiers regarding the process.

At block 203, when it is detected that the process is running an executable function, the monitor function library may suspend the executable function the process runs and output process monitoring information.

At block 204, if a feedback to the process monitoring information indicates that the implementation of the executable function the process runs can be continued, then a system function library may be invoked based on the process information parameters to continue performing the executable function the process runs. Otherwise, the executable function the process runs may be terminated.

In an example, the procedure of creating (block 201) the monitor function library based on the preset executable functions may include: searching function pointers of executable function families (including such as functions named execve, execl, execle, execlp, execv and execvp) within the system function library, and establishing the monitor function library according to the search result. In another example, the monitor function library may include other executable function families, which can be set according to the user's requirements.

Specifically, at block 202, when the process gains the superuser privilege, e.g., when the SU program grants the superuser privilege to the process, the monitor function library created at block 201 may be loaded. The monitor function library may change the function pointer relating to the system function library. After that, when the system function library requires to run an executable function included in the monitor function library, the operation may be performed by the monitor function library. In an example, a technique of hooking may be used for intercepting function calls passed between the process and the system function library. Initially, the monitor function library may change function pointers of executable functions managed by itself. Specifically, a real function pointer directly pointing to an executable function is replaced by a proxy function pointer pointing to the monitor function library. In other words, the proxy function pointer is provided for invoking, not the real function pointer. When the process intends to call an executable function, the function pointer it invokes is a proxy function pointer pointing to the monitor function library. Then, the monitor function library may supervise the implementation of the executable function.

In an example, a SU sub-process may be generated at block 202. The SU sub-process may get the process information parameters of the process that originally makes an authorization request. The process information parameters may include a user ID (uid) of the process, a user group ID (gid) of the process, and a process name for identifying the corresponding process. In an example, an environment variable (named LD_PRELOAD) may be used when configuring parameters for the SU sub-process. Specifically, a technique of preloading may be employed. The process information parameters of the process originally proposes the authorization request may be transferred to the newly generated SU sub-process via the environment variable, so that the newly generated SU sub-process can implement functions of the process that originally makes the authorization request. Of course, the configuration may be to continue implementing the process that makes the authorization request.

Specifically, at block 203, when a process or a SU sub-process that makes the authorization request requires to perform an executable function included in the monitor function library, the requirement may be transmitted directly to the monitor function library through a function pointer. In this way, the monitor function library is able to detect the executable function the process runs, suspend the executable function the process runs, and output process monitoring information to users or other monitoring devices.

Specifically, at block 204, the user may know which process is performing an operation by checking the process monitoring information, and find out which function the process is going to perform. Based on the above information, the user can react to the process monitoring information, e.g., determine whether to allow the process to perform the corresponding function or not. If a feedback to the process monitoring information given by the user is to continue the executable function the process runs, the system function library may be invoked to continue performing the executable function the process runs based on the process information parameters. Otherwise, terminate the implementation of the executable function the process runs.

In an example, a feedback list may be used to set feedback types of the process monitoring information. Then, it can be determined whether to continue or terminate execution via looking into the feedback list. Also, users can record process information parameters about the process, thus preserving the history of function implementation relating to the process.

In this way, the user may be aware of the operation of the authorized process. Specifically, the implementation of all the executable functions run by the process having the superuser privilege may be controlled, thereby ensuring the security of the operating system of the computing device.

Figure 3:
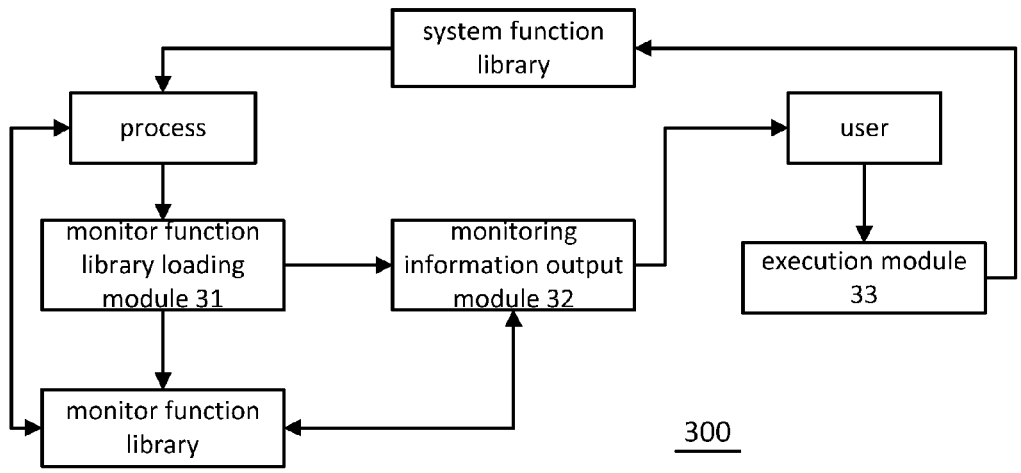
FIG. 3 is a block diagram illustrating a device for implementing a process under a superuser privilege according to an embodiment of the present disclosure.

FIG. 3 is a block diagram illustrating a device 300 for implementing a process under a superuser privilege according to an embodiment of the present disclosure. The device 300 for implementing a process under a superuser privilege includes: memory, and one or more processors. The memory stores one or more program modules configured for execution by the one or more processors. In an example, the one or more program modules include: a monitor function library loading module 31, a monitoring information output module 32, and an execution module 33.

The monitor function library loading module 31 is to load a monitor function library for monitoring an executable function when the process acquires the superuser privilege.

The monitoring information output module 32 is to suspend the running of the executable function and output process monitoring information when it is detected that the process is running the executable function.

The execution module 33 is to invoke a system function library to perform the executable function the process runs if a feedback to the process monitoring information indicates that it is allowable to perform the executable function.

In an example, the monitoring information output module 32 controls the monitor function library to suspend the running of the executable function and output the process monitoring information when it is detected that the process is running the executable function.

The implementation of the device 300 illustrated in FIG. 3, and the execution of the modules included in the device 300 may refer to such as FIGS. 1-2, which may not be described in detail repeatedly.

Figure 4:
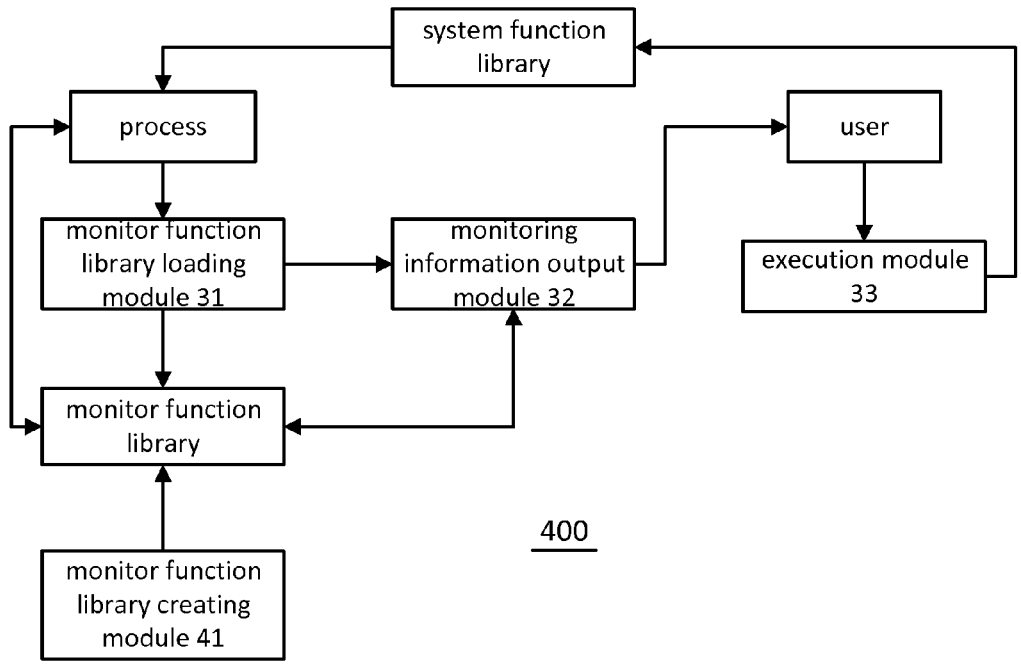
FIG. 4 is a block diagram illustrating a device for implementing a process under a superuser privilege according to an embodiment of the present disclosure.

FIG. 4 is a block diagram illustrating a device 400 for implementing a process under a superuser privilege according to an embodiment of the present disclosure. Similar to the device 300 shown in FIG. 3, the device 400 may include: a monitor function library loading module 31, a monitoring information output module 32, and an execution module 33. Further, the device 400 includes: a monitor function library creating module 41, to create the monitor function library to monitor one or more designated executable functions.

In an example, the monitor function library loading module 31 is further to obtain process information parameters of the process when the process acquires the superuser privilege, and the execution module 33 is further to invoke the system function library to perform the executable function the process runs based on the process information parameters.

In an example, the execution module 33 is further to terminate the running of the executable function if the feedback to the process monitoring information indicates that it is not allowable to perform the executable function.

Specifically, the monitor function library creating module 41 may create the monitor function library based on preset one or more executable functions, and search function pointers of executable function families within the system function library to establish the monitor function library.

In an example, the monitor function library loading module 31 may control the monitor function library to change the function pointer of the system function library when the process has the superuser privilege. In this way, when the process runs, within the system function library, an executable function monitored by the monitor function library, the implementation of the executable function may be under the control of the monitor function library. Meanwhile, the monitor function library loading module 31 may obtain the process information parameters of the process.

In an example, the monitoring information output module 32 may take control of the monitor function library to suspend the running of the executable function and output process monitoring information when it is detected that the executable function is run by the process.

In an example, the process monitoring information output by the monitoring information output module 32 may be provided to such as a monitoring device or a user, and a feedback corresponding to the process monitoring information may be obtained. If the feedback type is to continue execution, the execution module 33 may call the system function library in accordance with the process information parameters obtained by the monitor function library loading module 31 to continue performing the executable function the process runs. If the feedback type is to terminate execution, the execution module 33 may terminate the running of the executable function the process runs.

The implementation of the device 400 illustrated in FIG. 4, and the execution of the modules included in the device 400 may also refer to such as FIGS. 1-2, which may not be described in detail repeatedly.

By using the device provided in such as FIG. 3 or 4, a monitor function library is loaded for monitoring executable functions run by a process, and it is determined whether to perform an executable function based on a feedback provided for process monitoring information. As such, designated executable functions can be monitored effectively, thereby ensuring the security of the computing device under the superuser privilege. In other words, the security of implementing a process under a superuser privilege may be increased by using the device provided in such as FIG. 3 or 4 to patch flaws.

Figure 5:
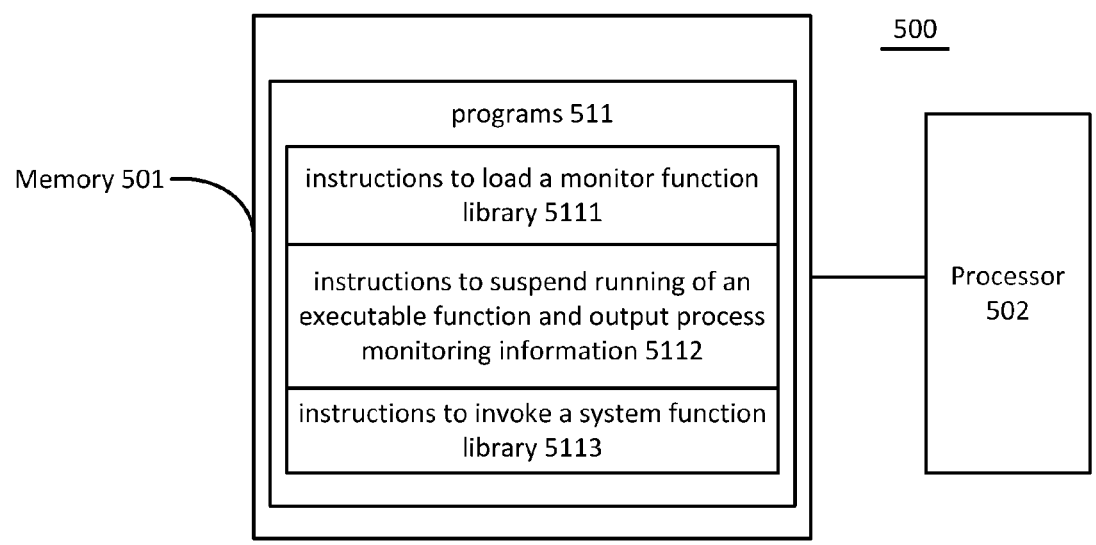
FIG. 5 is a schematic diagram illustrating a structure of a mobile terminal according to an embodiment of the present disclosure.

FIG. 5 is a schematic diagram illustrating a structure of a mobile terminal according to an embodiment of the present disclosure. In an example, the mobile terminal 500 includes: memory 501, one or more processors 502, and one or more programs 511 stored in the memory 501 and configured for execution by the one or more processors 502. Specifically, the one or more programs 511 include instructions to: load (5111) a monitor function library for monitoring an executable function when the process acquires the superuser privilege; when it is detected that the process runs the executable function, suspend (5112) the running of the executable function and output process monitoring information; and invoke (5113) a system function library to perform the executable function the process runs if a feedback to the process monitoring information indicates that it is allowable to perform the executable function. The implementation of the mobile terminal 500 illustrated in FIG. 5 may refer to such as FIGS. 1-4. In an example, the mobile terminal may be a smartphone, a tablet, a digital camera, or an electronic device which has set a superuser privilege.

In an example, the one or more programs 511 further include instructions to: obtain process information parameters of the process when the process acquires the superuser privilege; and invoke the system function library based on the process information parameters.

In an example, the one or more programs 511 further include instructions to: terminate the running of the executable function if the feedback to the process monitoring information indicates that it is not allowable to perform the executable function.

In an example, the one or more programs 511 further include instructions to: create the monitor function library to monitor one or more designated executable functions.

In an example, the one or more programs 511 further include instructions to: change a function pointer of the system function library to detect the running of the executable function.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

The above examples may be implemented by hardware, software, firmware, or a combination thereof. For example the various methods, processes and functional modules described herein may be implemented by a processor (the term processor is to be interpreted broadly to include a CPU, processing unit/module, ASIC, logic module, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules are implemented as machine readable instructions executable by one or more processors, hardware logic circuitry of the one or more processors or a combination thereof. The modules, if mentioned in the aforesaid examples, may be combined into one module or further divided into a plurality of sub-modules. Further, the examples disclosed herein may be implemented in the form of a software product. The computer software product is stored in a non-transitory storage medium/device and comprises a plurality of instructions for making an electronic device implement the method recited in the examples of the present disclosure.

What is claimed is:

1. A method for implementing a process under a superuser privilege within a computing device, the method comprising:
    loading a monitor function library for monitoring an executable function when the process acquires the superuser privilege;
    when it is detected that the process runs the executable function, suspending, by the monitor function library, the running of the executable function, and outputting process monitoring information; and
    invoking a system function library to perform the executable function the process runs if a feedback to the process monitoring information from a user indicates that it is allowable to perform the executable function.

2. The method according to claim 1, wherein loading the monitor function library further comprises: obtaining process information parameters of the process when the process acquires the superuser privilege; and
    wherein invoking the system function library comprises:
    invoking the system function library based on the process information parameters.

3. The method according to claim 1, further comprising:
    if the feedback to the process monitoring information indicates that it is not allowable to perform the executable function, terminating the running of the executable function.

4. The method according to claim 1, further comprising:
    creating the monitor function library to monitor one or more designated executable functions.

5. The method according to claim 1, further comprising:
    changing, by the monitor function library, a function pointer of the system function library to detect the running of the executable function.

6. A device for implementing a process under a superuser privilege, the device comprising: memory, and one or more processors;
    the memory stores one or more program modules configured for execution by the one or more processors;
    wherein the one or more program modules comprise:
    a monitor function library loading module, to load a monitor function library for monitoring an executable function when the process acquires the superuser privilege;
    a monitoring information output module, to suspend the running of the executable function and output process monitoring information when it is detected that the process runs the executable function; and
    an execution module, to invoke a system function library to perform the executable function the process runs if a feedback to the process monitoring information from a user indicates that it is allowable to perform the executable function.

7. The device according to claim 6, wherein the monitor function library loading module is further to: obtain process information parameters of the process when the process acquires the superuser privilege; and
    the execution module is further to: invoke the system function library based on the process information parameters.

8. The device according to claim 6, wherein the execution module is further to:
    terminate the running of the executable function if the feedback to the process monitoring information indicates that it is not allowable to perform the executable function.

9. The device according to claim 6, further comprising:
    a monitor function library creating module, to create the monitor function library to monitor one or more designated executable functions.

10. The device according to claim 6, wherein the monitoring information output module is further to:
    change a function pointer of the system function library to detect the running of the executable function.

11. A mobile terminal, comprising:
    memory;
    one or more processors; and
    one or more programs stored in the memory and configured for execution by the one or more processors, the one or more programs including instructions to:
    load a monitor function library for monitoring an executable function when the process acquires the superuser privilege;
    when it is detected that the process runs the executable function, suspend the running of the executable function, and output process monitoring information; and invoke a system function library to perform the executable function the process runs if a feedback to the process monitoring information from a user indicates that it is allowable to perform the executable function.

12. The mobile terminal according to claim 11, wherein the one or more programs further include instructions to:
   obtain process information parameters of the process when the process acquires the superuser privilege; and
   invoke the system function library based on the process information parameters.

13. The mobile terminal according to claim 11, wherein the one or more programs further include instructions to:
   terminate the running of the executable function if the feedback to the process monitoring information indicates that it is not allowable to perform the executable function.

14. The mobile terminal according to claim 11, wherein the one or more programs further include instructions to:
   create the monitor function library to monitor one or more designated executable functions.

15. The mobile terminal according to claim 11, wherein the one or more programs further include instructions to:
   change a function pointer of the system function library to detect the running of the executable function.

* * * * *